United States Patent

[11] 3,575,242

| [72] | Inventor | Nils O. Olsson<br>Ancaster, Ontario, Canada |
|---|---|---|
| [21] | Appl. No. | 795,451 |
| [22] | Filed | Jan. 31, 1969 |
| [45] | Patented | Apr. 20, 1971 |
| [73] | Assignee | International Harvester Company<br>Chicago, Ill. |

[54] MARKER LIFT
4 Claims, 5 Drawing Figs.

[52] U.S. Cl. .................................................. 172/130,
172/225
[51] Int. Cl. ...................................................... A01b 35/32
[50] Field of Search .......................................... 172/126-
—132, 4, 6, 9, 225, 204, 227; 111/33

[56]          References Cited
          UNITED STATES PATENTS
2,092,589   9/1937   Scarlett .......................   172/130X

| 2,755,721 | 7/1956 | Rusconi........................ | 172/4 |
| 3,139,941 | 7/1964 | Graham et al. ............... | 172/130 |
| 3,374,842 | 3/1968 | Smith ........................... | 172/7 |
| 3,425,495 | 2/1969 | Reeve et al. .................. | 172/6X |

FOREIGN PATENTS

| 185,147 | 9/1963 | Sweden ....................... | 172/130 |

Primary Examiner—Robert E. Pulfrey
Assistant Examiner—Stephen C. Pellegrino
Attorney—Noel G. Artman

ABSTRACT: A flexible cable connecting right- and left-hand markers of an agricultural implement such as a grain drill, is provided with a central balance bar having a limited slidable connection with a swingable lift arm for the markers and having stops engageable with the arm to raise one of the markers and lower the other, the lift arm being operated by a hydraulic cylinder electrically actuated from a remote switch.

PATENTED APR 20 1971 3,575,242

INVENTOR
NILS O. OLSSON
James K McNeil
ATT'Y

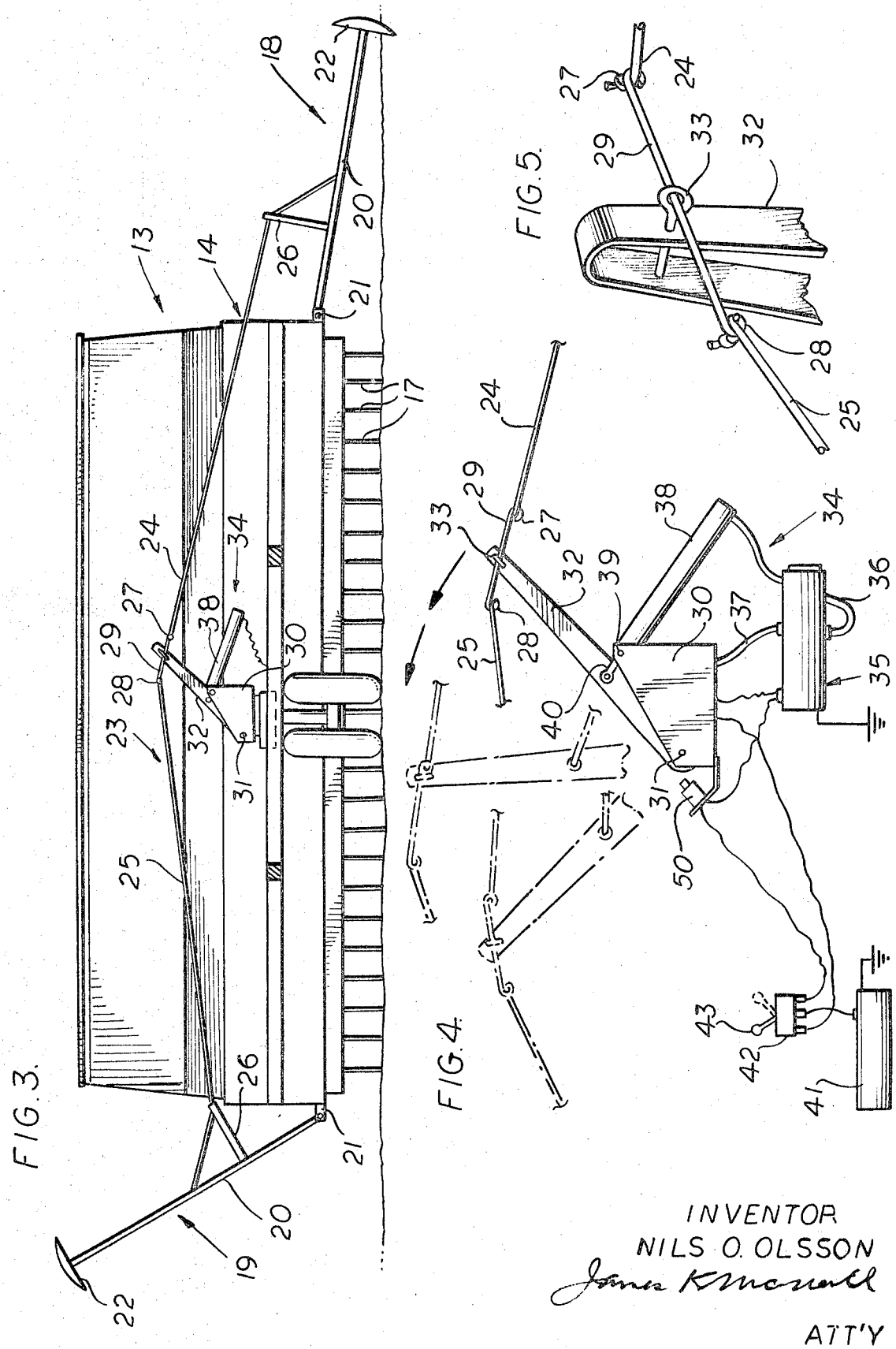

MARKER LIFT

BACKGROUND OF THE INVENTION

This invention relates to earthworking implements and particularly to grain drills and the like. More specifically, the invention concerns earth markers for such implements and to novel means for effecting raising and lowering thereof.

In the operation of tractor-propelled grain drills and the like it is customary to provide a simple flexible cable connection between the right- and left-hand markers.

Markers of the type with which this invention is concerned are used with implements to form a trench or furrow that will line up with the tractor front wheel in one passage across a field and serve as a guideline for the next passage, assisting the operator in maintaining the desired row spacing between runs. Where right- and left-hand markers are used it is necessary at the end of a run across the field to raise the operating marker and lower the other for the next run. On conventional marker attachments this operation is performed by a tractor operator pulling on the rope or cable, the ends of which are connected to the respective markers. This cable permits the weight of the marker being lowered to operating position to assist in raising the other marker, but is inconvenient in that, in addition to performing this task at the end of the field, the operator is occupied by the tasks, in the case of grain drills and the like, of lifting the furrow openers from the ground and also negotiating the turn and lining up the tractor and drill for the next run. This is particularly difficult when the operator is stationed in a closed modern cab. The present invention, therefore, has for its object the provision of novel control means for effecting power operation of a pair of markers.

Another object of the invention is the provision of novel remotely controlled means for alternately moving markers between operating and transport positions.

DESCRIPTION OF THE DRAWINGS

FIG. 3 is a front elevation on an enlarged scale representing a section taken on the line 3—3 of FIG. 1;

FIG. 4 is another enlarged diagrammatic detail of the control means of this invention; and FIG. 5 is a detail in perspective of a portion of the control means of this invention.

Figure 1:
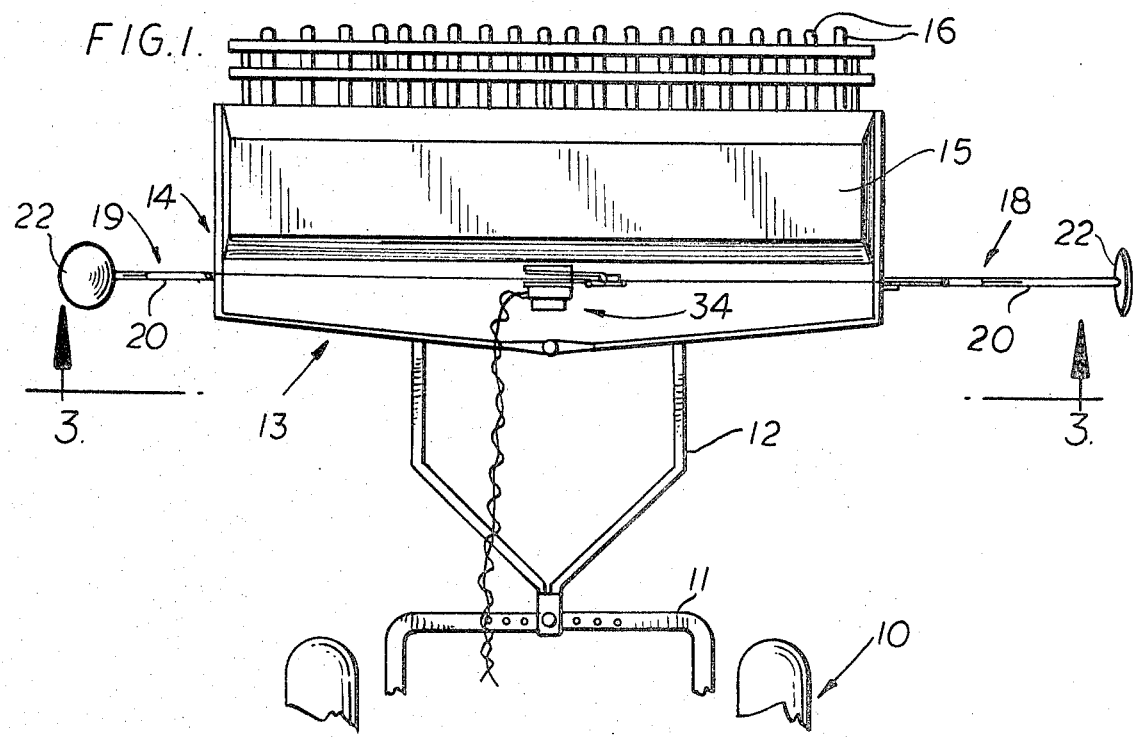
FIG. 1 is a diagrammatic plan view of a grain drill having a pair of markers thereon, and marker operating means incorporating the features of this invention.
Figure 2:
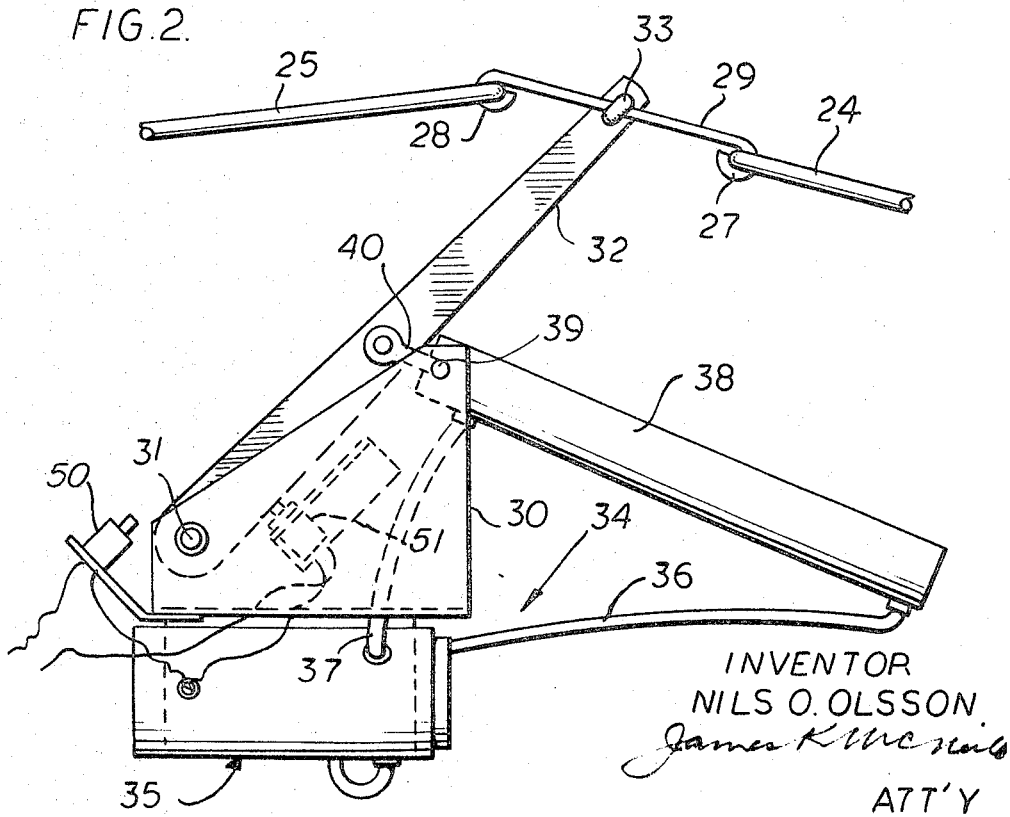
FIG. 2 is an enlarged detail of a portion of the marker control means of this invention.

The numeral 10 designates a tractor having the usual source of fluid under pressure as well as an electric current source, not shown, and a drawbar 11 to which is connected the hitch 12 of an implement in the form of a grain drill 13. The drill comprises a frame 14 upon which is mounted an elongated hopper 15, press wheels 16 and furrow opener units indicated at 17.

A pair of left- and right-hand markers 18 and 19, respectively, are mounted on the frame and each comprises an elongated arm 20 pivotally connected at its inner end to a lug 21 affixed to the implement frame and having mounted on its outer end an earth penetrating disc 22.

In FIGS. 1 and 3 left-hand marker unit 18 is shown in its lowered or operating position while the right-hand unit 19 is shown in its raised or nonoperating position, the markers 18 and 19 being alternately raised and lowered when turning at the end of a field. Alternate operation of the markers is accomplished by lift means including flexible cable means indicated at 23 comprising a pair of flexible sections 24 and 25 each of which is slidably connected to an upright 26 secured to arm 20 and having their outer ends anchored to the arms 20 of the respective left- and right-hand marker assemblies 18 and 19. The inner ends of cable sections 24 and 25 are secured to eyes 27 and 28 formed at the ends of a relatively inflexible or rigid member in the form of a balance bar 29, the eyes 27 and 28 forming stops for a purpose hereinafter to become clear.

A pair of plates 30 are mounted on the implement frame centrally thereof and carry a pivot pin 31 upon which is mounted the lower end of an elongated U-shaped lever arm 32 the upper end of which carries a swivel 33 in which is slidably received the rodlike relatively inflexible member 29. It should be clear that since member 29 is slidable in swivel 33 lost motion is provided in the connection of arm 32 to the cable means 23, accommodating vertical floating movement of the operating marker without placing lever arm 32 or cylinder 38 under stress. It should likewise be clear that upon swinging movement of arm 32 about its pivot 31 in the direction of the axis of cable means 23, for example, to the left in FIG. 3, left-hand operating marker 18 will be lifted and right-hand marker 19 lowered to its operating position.

Power-operated force transmitting means generally indicated at 34 is provided for swinging arm 32 to alternately raise and lower the markers and includes an electrohydraulic pump 35 of any well-known type adapted to supply fluid under pressure through hose lines 36 and 37 to the ends of a cylinder 38, one end of which is pivotally mounted at 39 between the plates 30 and has slidable therein a piston rod 40 which is pivotally connected to arm 32.

The direction of the flow of fluid to one end or the other of cylinder 38 is under the control of conventional electrically operated control means partially contained in the electrohydraulic pump 35. Electric current from a source such as battery 41 is directed to the electrohydraulic pump 35 through a two-position switch 42 having a control arm 43 movable from the solid to the dotted line position of FIG. 4 to direct fluid to one end or other of the cylinder 38 to swing lever arm 32 in opposite directions. Upon extension of piston rod 40 in cylinder 38 from the position shown in the drawings, lever arm 32 slides along member 29 until it engages stop 28 to lift the marker 18. When arm 32 reaches the midpoint of its travel the markers 18 and 19 are in equilibrium, and upon further swinging of the arm the weight of right-hand marker 19 begins to take effect to lift the left-hand marker, member 29 sliding through eye 33 the successive positions of the parts being indicated in dotted lines in FIG. 4. The electrically operated control means includes a pair of auxiliary limit switch means 50 and 51. Limit switch means 50 and 51 are mounted such that they are engaged by arm 32 after it has oscillated a predetermined arc about pivot 31. Engagement of either limit switch 50 or 51 by arm 32 functions to interrupt the flow of electric current to electrohydraulic pump 35, stopping the flow of hydraulic fluid to cylinder 38 and thereby stopping movement of arm 32 about pivot 31. This procedure is reversed by the tractor operator shifting switch arm 43 to its second position, it being understood that the switch is located remotely from the electrohydraulic pump 35 in a position on the tractor readily accessible to the tractor operator. To again raise marker 19 and lower marker 18 the foregoing procedure is reversed.

It is believed that the construction and operation of the marker lift means of this invention will be clearly understood from the foregoing description.

I claim:

1. In a tractor-propelled implement having a frame and a pair of transversely spaced right- and left-hand markers mounted thereon for alternate movement between raised nonoperating and lowered operating positions, flexible cable means having opposite free ends, said flexible cable means extending between and having said ends operatively connected to said markers for moving them between said positions upon longitudinally shifting the cable means, means for effecting said shifting of the cable means including a lever arm mounted on the frame operatively connected to said cable means medially of said ends and swingable in directions longitudinally of said cable means to shift said cable means in directions to raise one marker and lower the other, said connection between said lever arm and said cable means including lost-motion means accommodating limited relative movement between the arm and the cable means effective to permit the marker in operating position to rise and fall with the contour of the ground independently of said arm, said lost-motion means comprising a relatively inflexible member forming part of said cable means having a slidable connection with said lever arm and having space stops thereon alternately engageable with said lever arm after a predetermined swinging thereof to shift the cable means, power-operated force transmitting means mounted on the frame operatively connected to said lever arm for swinging said lever arm in opposite directions, and electrically operated control means operatively connected to said power transmission means including switch means movable between two positions to control the operation of said power transmission means.

2. In a tractor-propelled implement having a frame and a pair of transversely spaced right- and left-hand markers mounted thereon for alternate movement in a vertical plane between a generally horizontal operating position of one of said markers and a generally vertical raised nonoperating position wherein said markers are interconnected by flexible cable means extending therebetween, whereby motion of one marker from its raised nonoperating position to its lowered operating position is transmittable to the other marker to move it from its lowered operating position to its raised nonoperating position, the combination of an arm mounted on the frame for transverse swinging movement, wherein the swinging of said arm is effected by the provision of a two-way hydraulic fluid cylinder mounted on the frame and operatively connected to said arm, part of the stroke of the cylinder being utilized to slide said arm over said relatively rigid member until it engages one of said stops, said cable means including a relatively rigid member slidably connected to said arm, said relatively rigid member having stops spaced from each other and arranged such that they are alternately engaged by said arms forming operative connections therewith upon swinging the latter in opposite directions to alternately raise and lower said markers, said slidable connection accommodating vertical floating movement of the operating marker in response to variations in ground contour independently of the swinging of said arm.

3. The invention set forth in claim 2, wherein said cable means comprises a pair of flexible cable sections operatively connected at their outer ends to the respective of said markers and at their inner ends to the ends of said relatively rigid member.

4. The invention set forth in claim 3, wherein electric means operatively connected to said hydraulic fluid cylinder is provided for controlling the flow of fluid to said cylinder and said electric means is actuated by an operatively connected remote switch accessible to the tractor operator.